H. M. CLARK.
DRIVING MECHANISM FOR SELF PROPELLED VEHICLES.
APPLICATION FILED JULY 27, 1916.
1,254,885.
Patented Jan. 29, 1918.
2 SHEETS—SHEET 1.
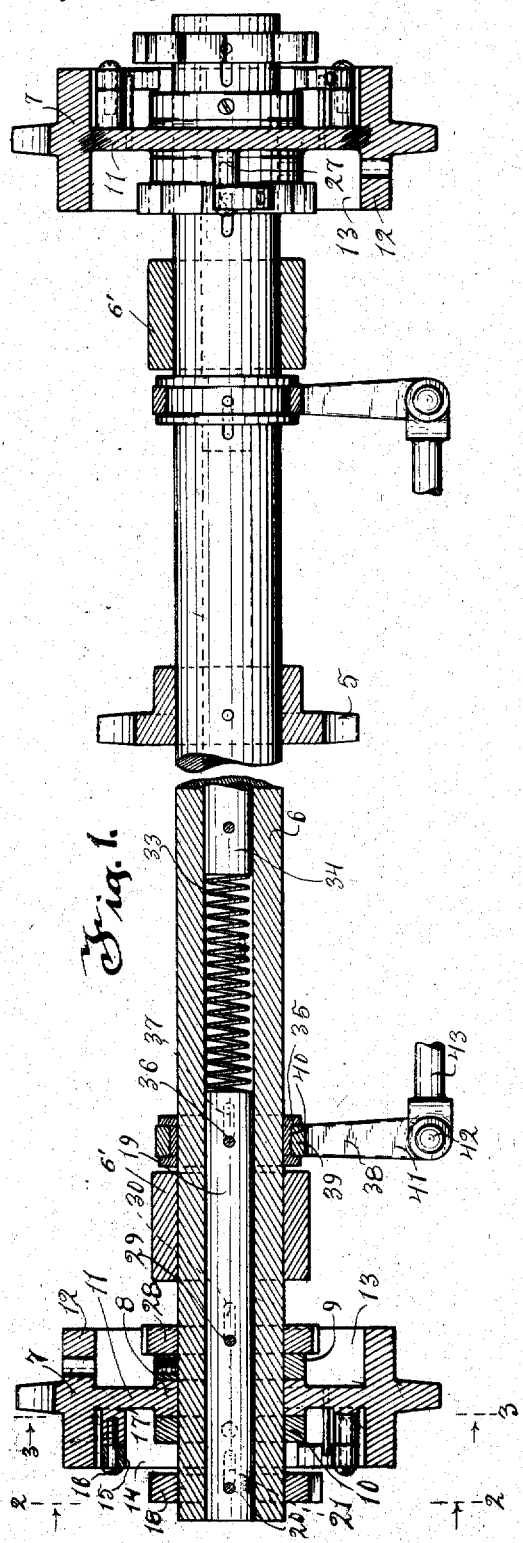
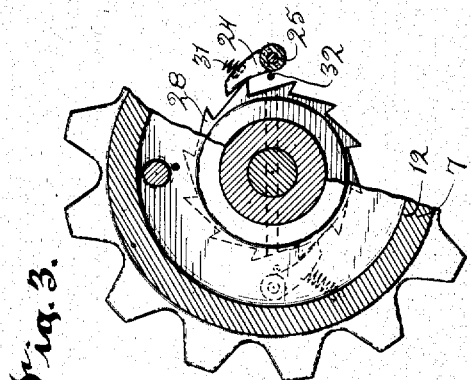
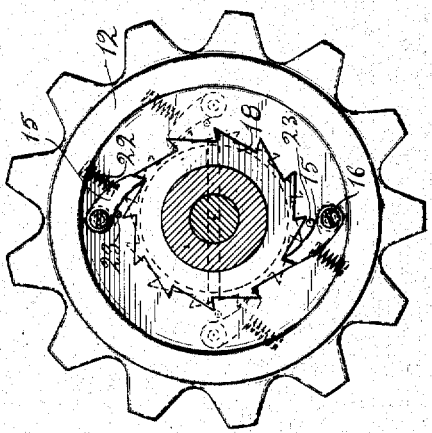
INVENTOR
Herbert M. Clark
Morrell, Keeney & French
ATTORNEYS

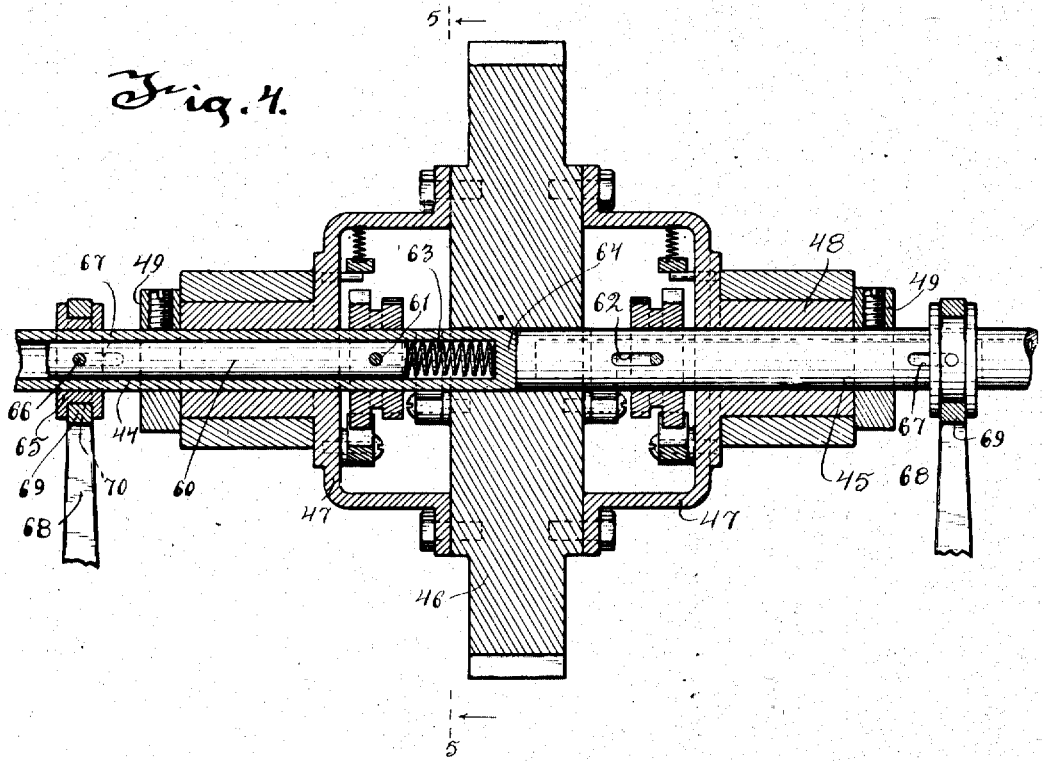

UNITED STATES PATENT OFFICE.

HERBERT M. CLARK, OF OSHKOSH, WISCONSIN.

DRIVING MECHANISM FOR SELF-PROPELLED VEHICLES.

1,254,885.  Specification of Letters Patent.  Patented Jan. 29, 1918.

Application filed July 27, 1916. Serial No. 111,545.

*To all whom it may concern:*

Be it known that I, HERBERT M. CLARK, a citizen of the United States, and resident of Oshkosh, Wisconsin, in the county of Winnebago and State of Wisconsin, have invented new and useful Improvements in Driving Mechanism for Self-Propelled Vehicles, of which the following is a description, reference being had to the accompanying drawings, which are a part of this specification.

The invention relates to driving mechanism for self-propelled vehicles.

The invention is more particularly designed to provide a driving mechanism for tractors.

At present in the construction of tractors it is usual to provide a differential driving mechanism similar to the usual differential gearing used on automobiles. This form of differential driving mechanism is objectionable in tractors because it is difficult to turn them. With the usual differential when the vehicle makes a turn more power is applied to the inside wheel than the outside wheel. I have found that when a tractor is turned if all the power or a greater portion of the power is applied to the inside wheel than to the outside wheel it is difficult to turn the tractor but that if the inside wheel is allowed to turn freely while the power is applied to the outside wheel the tractor may be easily turned. It is therefore the essential object of the present invention to provide a driving mechanism by which power may be applied to both of the driving wheels of the vehicle and also by which each of the wheels may be separately controlled so that either one of them may be driven while the other is allowed to run free to facilitate turning the vehicle.

The invention is further designed to provide a new and improved form of driving mechanism for vehicles.

In the drawings:

Figure 1 is a view of the device embodying the invention, parts being broken away and parts being shown in section;

Fig. 2 is a section taken on the line 2—2 of Fig. 1;

Fig. 3 is a section taken on the line 3—3 of Fig. 1;

Fig. 4 is a view of a modified form of the device embodying the invention, parts being broken away and parts being shown in section;

Fig. 5 is a section taken on the line 5—5 of Fig. 4.

In general the device comprises a hollow drive shaft or shafts, a driving connection between said shaft or shafts and the wheel of the vehicle, and means for separately controlling the driving connection to each wheel.

In Figs. 1 to 3 inclusive I have shown a hollow drive shaft or axle 6 upon which the driving mechanism embodying the invention is mounted. The drive shaft 6 is rotated from any suitable source of power as by a suitable engine and is journaled in bearings 6' and this may be done by connecting the gear 5 mounted on the shaft 6 to the engine through suitable gearing.

The driving connection between the shaft 6 and each of the wheels comprises in each instance a driven member or sprocket wheel 7 provided with a hub 8 loosely mounted upon the shaft 6 between fixed collars 9 and 10 secured to said shaft and having a web portion 11 and a flange portion 12 extending outwardly on either side of said web to form annular pockets or recesses 13 and 14. The driving road wheels are driven in the present instance by the two sprockets 7 through a chain and gear connection (not shown) with the road wheels. Any other suitable connection between the sprockets 7 and the road wheels may be used if desired, or the sprockets 7 may be converted into the hubs of the road wheels. As previously stated each of the sprockets 7 is loosely mounted on the drive shaft 6 and means are provided for locking each of said sprockets to drive the vehicle either forward or backward. In each instance this connection between the sprockets 7 and the shaft 6 for backward drive comprises a plurality of pawls 15 pivotally mounted on studs 16 secured to lugs 17 within the pockets extending outwardly from the web 11 into the pockets 14. These pawls are adapted to engage on the backward drive of the vehicle with the ratchet wheel 18 which is pinned to a rod 19 slidably but non-rotatably mounted within one end of the shaft 6. The pin 20 which secures the sprocket 18 to the shaft 19 extends through longitudinally extending slots 21 in opposite sides of the shaft 6. The pawls are normally held in operative position by springs 22 secured to the pawls and to the flange 12 of the sprocket 7 and the downward movement of said pawls is limited by pins 23 secured to the web 11 of the sprocket. The means for connecting each sprocket 7 to the shaft 6 for forward drive of the vehicle comprises a plurality of pawls 24 pivotally mounted on pins 25 secured to lugs 27 connected to the web 11 and projecting outwardly into the pockets 13. The pawls 24 are adapted to engage a ratchet wheel 28 which is slidably but non-rotatably mounted upon the shaft by means of a pin 29 passing through slots 30 in opposite sides of the hollow shaft 6 and secured to the slidable rod 19. The pawls 14 are normally held in operative position by springs 31 similar to the springs 22 and similarly connected to the pawls and flange 12 and are similarly limited in their downward movement by pins 32 similar to the pins 23 previously described. The rods 19 disposed within the hollow of the shaft at the ends thereof are normally held in outermost position for forward drive by means of springs 33 disposed within the hollow shaft 6 between the inner ends of the rod 19 and a stop block 34 secured within the hollow of the shaft 6.

The means for separately controlling the drive to the road wheels comprises means for separately bringing either set of pawls on each sprocket 7 into driving relation with the shaft 6. This means consists of a mechanism for moving each rod 19 together with the ratchets 18 and 28 with respect to the shaft 6 and the sprocket 7 and consists of a collar 35 slidably but non-rotatably mounted upon the shaft 6 by a pin 36 which extends through longitudinally extending slots 37 in opposite sides of the shaft 6 and is secured to the inner end of the rod 19 and further consists of means for shifting the collar 35 with respect to the shaft 6. This collar-shifting-means consists of a yoke member 38 the yoke arms 39 of which are disposed in an annular groove 40 in the collar 35 and the end 41 of which is pivotally secured by a pin 42 to a control rod 43. With the mechanism above described when it is desired to drive both wheels of the tractor or vehicle forwardly the rods 19 are moved outwardly through the collars 35, yokes 38 and control rods 43 assisted by the springs 33 to bring the ratchets 28 into engagement with the pawls 24 carried by the sprockets 7. When it is desired to reverse the drive of the vehicle the rods 19 are moved inwardly the pins 20, 29 and 36 moving outwardly in the slots 21, 30 and 37 through the movement of the collars 35, yokes 28 and control rods 43 to bring the ratchet wheels 18 inwardly into engagement with the pawls 15 to connect the sprockets 7 in driving relation with the shaft 6. As previously pointed out on the turning of the vehicle it is necessary to allow the inner road wheel to run free while the power is applied to the outer road wheel to facilitate the turning movement and this is accomplished through the mechanism above described owing to the fact that each of the rods 19 at the ends of the shaft 6 are separately controlled. Thus if it is desired to turn the vehicle toward the left the power is applied to the outer road wheel through the sprocket 7 at the upper right hand corner in the drawings and the sprocket 7 at the other end of the shaft is free to turn loosely thereon by the manipulation of the rods 19 through the control means previously described. This is accomplished by connecting up the right hand sprocket 7 with the shaft 6 for forward drive and throwing the drive for the left hand sprocket 7 into reverse drive by bringing the ratchet 18 into engagement with the pawls 15. When the ratchet 18 on the left hand sprocket is in engagement with the pawls 15 on the forward drive of the vehicle no driving movement will be imparted to the sprocket 7 owing to the fact that the forward drive of the shaft 6 will cause the pawls 15 to move freely over the teeth of the ratchet 18. If it is desired to turn the vehicle in the opposite direction the left hand sprocket is thrown into forward drive and the right hand sprocket into reverse. Thus the separate control means enable the operator to throw the drive on to either wheel and allow the other wheel to run idle to facilitate the turning movement of the tractor.

The mechanism shown in Figs. 4 and 5 of the drawing differs from the former construction in that the pair of axles or drive shafts 44 and 45 are employed which shafts are adapted to be connected up to any suitable source of power through separately controlled driving connections. The road wheels of the vehicle may be directly connected to the shafts 44 and 45 or they may be connected to them through any suitable driving connection.

The means for connecting either of the shafts 44 and 45 to the source of power is similar in each instance so only one of said connections need to be described, each of said connections being operatively connected to a single gear 46 which is connected up to the engine through any suitable form of gearing (not shown). The means for connecting the gear 46 to either of the shafts 44 and 45 comprises means for locking the gear 46 against rotation to either of said shafts. The gear 46 is provided with a pair of housings 47 on either side thereof which have the hub portions 48 loosely mounted on the shafts 44 and 45 between fixed collars 49 carried by the shafts. The gear 46 is locked to either shaft through means for locking the housing to either of said shafts.

In each instance this comprises means for locking the housing to the shaft for forward drive and means for locking the housing for backward drive of the vehicle. The means for locking the housing 47 to the shaft for forward drive comprises a plurality of pawls 50 pivotally mounted on studs 51 secured to the housing 47 and a ratchet wheel 52 with which said pawls 50 engage. The pawls 50 are normally held in operative position by means of springs 53 and the downward movement of the pawls is limited by stop pins 54 carried by the housing. The means for rotating the road wheels in the reverse direction comprises a plurality of pawls 55 pivotally mounted on studs 56 secured to the gear 46 and a ratchet wheel 57 with which the pawls engage, ratchet wheel 57 in the present instance being integral with the ratchet wheel 52 but having teeth pitched in the opposite direction to those of the ratchet wheel 52. The pawls 55 are normally held in operative position by means of springs 58 connected to them and to the housing 47 and their downward movement is limited by stop pins 59 secured to the gear 46.

Means are provided for shifting the ratchets 52 or 57 into engagement with their respective pawls and this consists in each instance of a shaft 60 mounted within the hollow of the drive shaft 44 and means for controlling the movement of said shaft. The ratchets 52 and 57 are secured to the shaft 60 by means of a pin 61 which is slidably mounted in slots 62 in opposite sides of the drive shaft and the shaft 60 is normally held in outer position for forward drive by means of a spring 63 interposed between the end of the shaft 60 and the end of the shaft 64 of the drive shaft. The means for controlling or operating the shaft 60 in each instance comprises a collar 65 secured to the shaft 60 by a pin 66 which passes through longitudinally extending slots 67 in opposite sides of the drive shaft so that said collar is slidably but non-rotatably mounted on said drive shaft and further consists of a yoke member 68, the yoke arms 69 of which are mounted in the annular groove 70 in the collar 65. Any suitable means may be employed to operate the yokes 68 to shift the collar 65 and consequently the shaft 60 and the ratchets 52 and 57. It will be noted that each of the drive shafts is separately controlled through its control shaft 60 and this as previously pointed out will allow one of the road wheels to run idle while the other is being driven.

The operation of this form of driving mechanism is similar to that previously described for when the ratchets 52 on both shafts are in engagement with the pawls 50 carried by the housings 47 the gear 46 will be connected up to said shafts for forward drive and when the ratchets 57 are in engagement with the pawls 55 on both shafts the vehicle will be driven backwardly through the connection of the gear 46 with the engine. Now if it is desired to turn the vehicle to the left the clutch mechanism for the right hand wheel is shifted for forward drive through the manipulation of the yoke member 68 and the clutch member for the left hand wheel is thrown into reserve under which conditions the pawl 55 for the left hand wheel will ride over the teeth of the ratchet 57 and consequently the left hand wheel will remain idle while power is being transmitted to the right hand wheel to make the turn to the left.

The invention thus exemplifies a separate driving connection for each of the road wheels of a vehicle so that said wheels may be driven either forward or backwardly and means for separately controlling said driving connections for each of said wheels.

What I claim as my invention is:

1. In a driving mechanism for a self-propelled vehicle, the combination with a drive member, of driven members loosely mounted with respect to said drive member, a reversible driving connection between said drive member and each of said driven members, and means for separately and independently controlling each of said driving connections.

2. In a driving mechanism for self-propelled vehicles the combination, with a drive shaft, of driven members loosely mounted thereon, reversible pawl and ratchet connections between said drive shaft and each of said driven members, and means for separately and independently controlling each of said driving connections.

3. In a driving mechanism for self-propelled vehicles, the combination with a drive shaft, of driven members loosely mounted thereon, reversely arranged pawls mounted upon the opposite sides of each of said driven members, reversely arranged ratchet wheels for each of said driven members slidably mounted on the drive shaft and coöperating with said pawls, and separate means for moving the ratchet wheels for each of said driven members to independently connect one set of pawls and ratchet wheel for one of said driven members and independently disconnect the other set.

4. In a driving mechanism for self-propelled vehicles, the combination, with a drive shaft, of driven members loosely mounted thereon, reversely arranged pawls mounted upon opposite sides of each of said driven members, reversely arranged ratchet wheels for each of said driven members slidably mounted on the drive shaft and coöperating with said pawls, means for normally maintaining corresponding pawls and ratchets for said driven members in driving engagement, and separate means for moving the ratchet wheels for each driven member to independently connect or disconnect the pawls and ratchets.

5. In a driving mechanism for self-propelled vehicles, the combination, with a drive shaft, of driven members loosely mounted thereon, reversely arranged pawls mounted upon opposite sides of each of said driven members, reversely arranged ratchet wheels for each of said driven members slidably mounted on the drive shaft and coöperating with said pawls, spring means for normally maintaining corresponding pawls and ratchets for said driven members in driving engagement, and separate means for moving the ratchet wheels for each of said driven members to independently connect or disconnect the pawls and ratchets for the driven members.

In testimony whereof, I affix my signature.

HERBERT M. CLARK.